March 27, 1934.  W. L. PAINTER  1,952,457
RACK FOR BAKING TINS AND THE LIKE

Filed Aug. 24, 1932

INVENTOR
WILLIAM L. PAINTER
BY
ATTORNEY

Patented Mar. 27, 1934

1,952,457

UNITED STATES PATENT OFFICE 1,952,457

RACK FOR BAKING TINS AND THE LIKE

William L. Painter, Minneapolis, Minn.

Application August 24, 1932, Serial No. 630,268

4 Claims. (Cl. 34—17)

This invention relates to storage and drying racks for circular objects such as pie tins, and the primary object is to provide a simple, practical and efficient design of rack that can be efficiently utilized in bakeries where large quantities of pies or similar edible units are baked and where it becomes necessary to cleanse and otherwise treat and store the baking tins or trays between baking operations. The rack is particularly adaptable for use in supporting relatively small pie tins, which, between baking operations, are cleansed by steaming and otherwise processed preliminary to heat treatment in drying ovens, and to that end is constructed to not only support a relatively large number of tins in vertical nested position, but is also designed to facilitate movement into and out of the drying oven as well as over the surface of supporting shelves upon which the racks are to be temporarily stored. Further and more specific objects will be disclosed in the course of the following specification, reference being had to the accompanying drawing, wherein:

Figure 1:
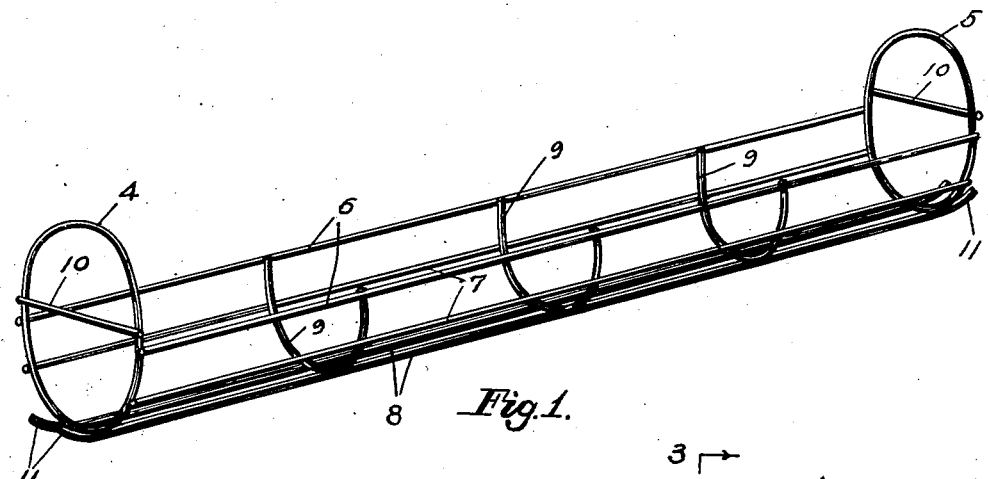
Fig. 1 is a perspective view of the rack.
Figure 2:
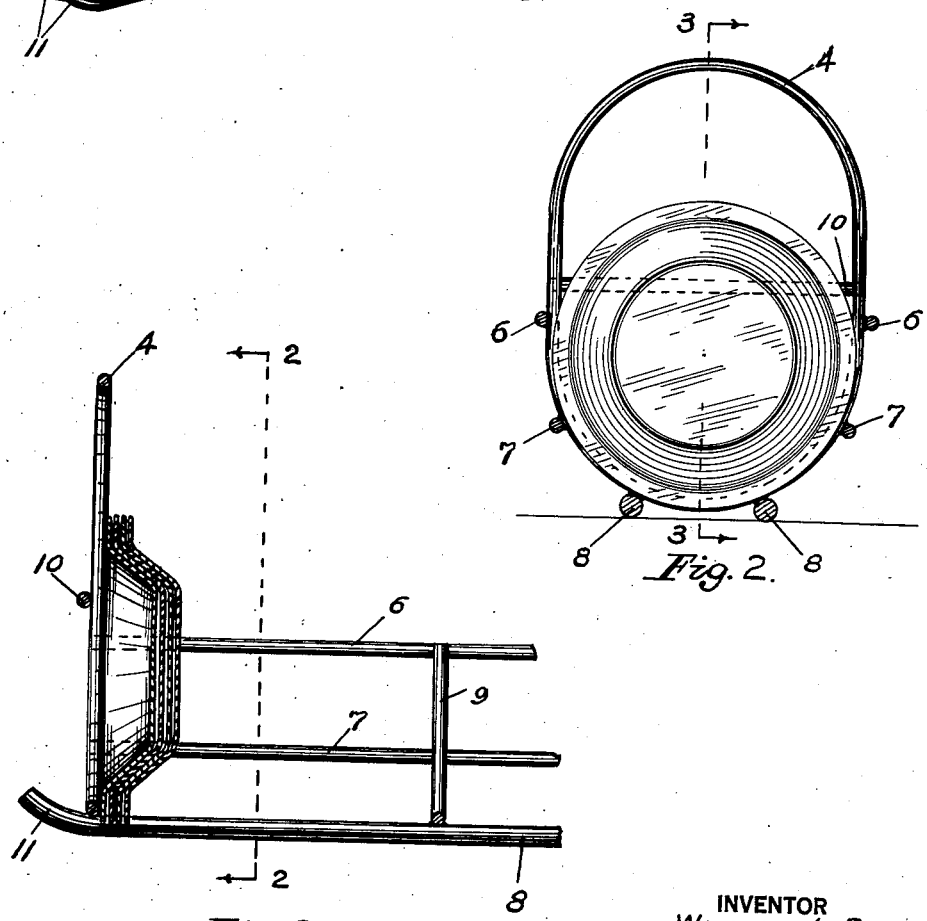
Fig. 2 is an enlarged cross sectional elevation through the rack, as seen on the line 2—2 in Fig. 3, this view illustrating the position assumed by the pie tins when placed in the rack.
Figure 3:
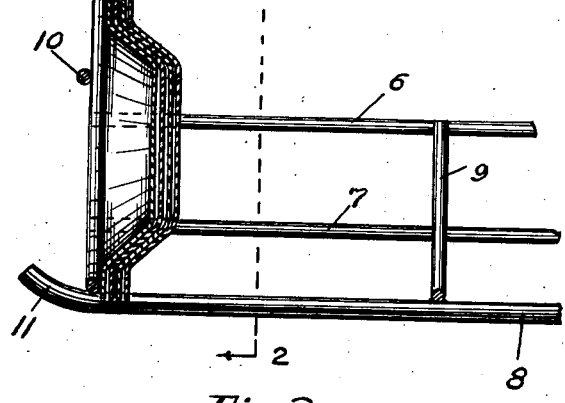
Fig. 3 is a sectional elevation taken longitudinally through one end of the tray, or as on the line 3—3 in Fig. 2.

Referring to the drawing more particularly and by reference characters, 4 and 5 designate slightly elliptical wire end loops for the rack, the same being connected by parallel side wires 6 and 7, and longitudinally extending base wires or bars 8. At spaced intervals between the end loops 4—5 the members 6, 7, and 8 are connected by semi-elliptical or semi-circular brace wires 9, the forms of which correspond to the lower sections of the loops 4 and 5. At points substantially between their upper and lower limits the loops 4 and 5 are provided with cross bars 10 to brace the rack and resist any tendency toward transverse spreading. At all points where the wire members 4 to 10 inclusive cross or contact they are rigidly united by spot welding, brazing or soldering to thus secure and unite them into a firm and rigid unitary structure, and, as such results in a skeleton frame trough for the reception of the baking tins in nested relation as indicated in Figs. 2 and 3.

It will be noted that the bars 8 are of heavier material, i. e., have a greater diameter than is found necessary for the bars or wires 6—7, one reason being that they act as runners for the rack and with relatively large diameters permit the baking tins and curved wires 4, 5, and 9 to clear the shelf or oven surface on which they are placed. Further reasons are that they thus present greater wearing surfaces and that as support runners they may afford ample stability of the rack against lateral tipping, thus rendering unnecessary the use of supporting legs which would interfere with longitudinal movement of the rack. To further assist in the longitudinal sliding action of the rack the bars 8 have upwardly curved extensions 11 which project beyond the loops 4—5, runner fashion. It may here be noted that the upper portions of the loops 4—5 serve as handles for carrying and manipulating the racks, so that the operator's hands need not come in contact with the baking tins.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A rack for baking tins or the like comprising an elongated frame made up of spaced parallel wires disposed in semi-circular conformation so as to define a skeleton trough, and connected by arcuate cross members, a pair of said wires at the bottom and near the longitudinal center of the rack being of larger diameter than the remaining wires, and disposed below the arcuate cross members so as to serve as runners and support the bottom curved portions of such cross members out of contact with a supporting surface.

2. A rack for baking tins or the like comprising an elongated frame made up of spaced parallel wires disposed in semi-circular conformation so as to define a skeleton trough, and connected by arcuate cross members, a pair of said wires, at the bottom and near the center of the rack serving as support runners for the rack and being disposed sufficiently below the arcuate cross members so as to clear the curved lower portions of the latter from contact with a supporting surface.

3. A rack for baking tins or the like comprising an elongated frame made up of spaced parallel wires disposed in semi-circular conformation so as to define a skeleton trough, and connected by arcuate cross members, a pair of said wires, at the bottom of the rack serving as support runners for the rack, and having upwardly bent end portions to facilitate sliding movement of the runners on a supporting surface.

4. A rack of the character described comprising an elongated trough shaped skeleton frame made up of parallel members connected by curved wires, certain of said parallel members forming a runner device extending longitudinally of the frame to slidably support the same, said runner device having upwardly turned ends to facilitate sliding action.

WILLIAM L. PAINTER.